United States Patent Office 3,637,551
Patented Jan. 25, 1972

3,637,551
MELT-CONDENSED POLYAMIDE
INTERPOLYMER ADHESIVES
Jerome W. Sprauer, Wilmington, Del., assignor to E. I. du
Pont de Nemours and Company, Wilmington, Del.
No Drawing. Continuation-in-part of application Ser. No.
832,422, June 11, 1969. This application May 21, 1970,
Ser. No. 39,574
Int. Cl. C08g 20/20
U.S. Cl. 260—18
9 Claims

ABSTRACT OF THE DISCLOSURE

Melt-condensed polyamide interpolymers consisting essentially of at least three different recurring polyamide repeat units in which about 20–100 mole percent of the imine groups are derived from polymethylene diamine of 6 to 20 carbons, about 5–65 mole percent of the carbonyl groups are derived from dimerized fatty acid of 16 to 48 carbons, about 8–65 mole percent of the carbonyl groups are derived from polymethylene diacid of 6 to 18 carbons, and about 8–65 mole percent of the carbonyl groups are derived from monomer selected from the group consisting of polymethylene diacid of 6 to 18 carbons different from the above diacid and polymethylene omega-aminoacid of 6 to 18 carbons, and which has an annealed heat of fusion of about 5 to 18 calories per gram, is quenchable to the amorphous state at a cooling rate of about 100° C. per minute, and has a glass transition temperature in the amorphous state of less than about 30° C., are useful as adhesives, particularly as adhesives for forming metal cans having side lapped seams.

CROSS-REFERENCE TO RELATED APPLICATION

This is a continuation-in-part of U.S. application Ser. No. 832,422, filed June 11, 1969, now abandoned.

BACKGROUND OF THE INVENTION

(1) Field of the invention

This invention relates to novel melt-condensed polyamides which are useful as polymeric binders.

(2) Description of the prior art

French Pat. No. 1,492,346 teaches the preparation of metal cans in which the metal is joined together by a side lapped seam using as the adhesive a polyamide obtained by the condensation of a polymethylene diamine with a polymethylene diacid or by the self condensation of a polymethylene omega-aminoacid.

In French Pat. No. 1,523,852 additional adhesives which are suitable for use in forming metal cans having side lapped seams are described. These adhesives are polyamides obtained by the condensation of a polymethylene diamine with a dimerized fatty acid, or by the condensation of a polymethylene diamine with a mixture of a dimerized fatty acid and a polymethylene diacid.

SUMMARY OF THE INVENTION

Melt-condensed polyamide interpolymers have now been discovered which have improved peel strength properties in adhesive applications, particularly as adhesives for use in the preparation of metal cans having side lapped seams. These melt-condensed polyamide interpolymers consist essentially of at least three different recurring polyamide repeat units in which (a) about 20–100 mole percent of the imine groups are derived from polymethylene diamine of 6 to 20 carbons, (b) about 5–65 mole percent of the carbonyl groups are derived from dimerized fatty acid of 16 to 48 carbons, (c) about 8–65 mole percent of the carbonyl groups are derived from polymethylene diacid of 6 to 18 carbons, and (d) about 8–65 mole percent of the carbonyl groups are derived from monomer selected from the group consisting of (1) polymethylene diacid of 6 to 18 carbons different from diacid (c), and (2) polymethylene omega-aminoacid of 6 to 18 carbons, said polyamide having an annealed heat of fusion of about 5 to 18 calories per gram, being quenchable to the amorphous state at a cooling rate of about 100° C. per minute, and having an upper glass transition temperature in the amorphous state of less than about 30° C. Preferably, about 35–100 mole percent of the imine groups are derived from polymethylene diamine.

The preferred melt-condensed polyamide interpolymers of this invention consist essentially of at least three different recurring polyamide repeat units in which (a) substantially about 100 mole percent of the imine groups are derived from hexamethylene diamine, (b) about 15–55 and preferably 25–55 mole percent of the carbonyl groups are derived from dimerized fatty acid of 36 carbons, (c) about 10–45 and preferably 15–45 mole percent of the carbonyl groups are derived from adipic acid, and (d) about 15–55 and preferably 15–45 mole percent of the carbonyl groups are derived from polymethylene diacid of 10 to 12 carbons, said polyamide having an annealed heat of fusion of about 7 to 15 calories per gram, being quenchable to the amorphous state at a cooling rate of about 90° C. per minute, and having an upper glass transition temperature in the amorphous state of less than about 20° C., and a melt index of less than about 15. Most preferably this polyamide has a minimum flow temperature of 180° to 210° C. and the dimerized fatty acid has a dimer content of at least about 90 percent.

DETAILED DESCRIPTION OF THE INVENTION

The polyamide interpolymers of this invention consist essentially of at least three different recurring polyamide repeat units derived from particular monomers. The term "polyamide interpolymer consisting essentially of," as used throughout the specification and claims, is meant to include polyamides containing repeat units derived from unspecified monomers which do not materially affect the basic and novel characteristics of the polyamide. That is, this term exclude polyamides containing repeat units derived from unspecified monomers of the type and in amounts which prevent the improved adhesive properties described herein from being realized. For example, a minor amount of diethylene triamine can be advantageously used in place of hexamethylene diamine to introduce a low concentration of secondary imine-links in the polymer chain as shown in the examples. Up to about 20 percent by weight of polyamide-forming monomer ingredients such as branched alkylene diamines, diacids, or aminoacids which are outside the scope of the specified monomers can be used for special purposes. One might also include minor amounts of terephthalic acid or p-aminocyclohexyl-bis-methane to slightly raise the glass transition temperature for some special reason.

The polyamide interpolymers must contain at least three different recurring polyamide repeat units. By "polyamide repeat unit" is meant, for example, a polymer unit of the structure

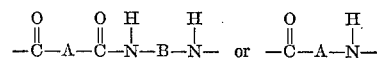

in which A and B are the same or different inert divalent linking radicals such as hydrocarbylene groups which commonly are polymethylene groups. This means that the polyamide must be derived from at least four different polyamide-forming monomers.

One of the required polyamide-forming monomers is one or more polymethylene diamine of 6 to 20 carbons. Suitable polymethylene diamines include hexamethylene diamine, heptamethylene diamine, octamethylene diamine, nonamethylene diamine, decamethylene diamine, undecamethylene diamine, dodecamethylene diamine, tridecamethylene diamine, and octadecamethylene diamine.

A second required polyamide-forming monomer is dimerized fatty acid of 16 to 48 carbons; that is, dimers derived from fatty acids of 8 to 24 carbons. These dimerized fatty acids are commercially available materials which have been fully described in the literature including U.S. Pat. Nos. 3,076,003, 3,157,681 and 3,256,304. These dimerized fatty acids are obtained by catalytic or non-catalytic polymerization of ethylenically unsaturated fatty acids. Suitable catalysts for the polymerization include acid or alkaline clays, di-t-butyl peroxide, boron trifluoride and other Lewis acids, anthraquinone, sulfur dioxide, and the like. Non-catalytic polymerization generally requires higher temperatures. Suitable fatty acids for use in the polymerization include branched and straight chain, poly- and mono-ethylenically unsaturated acids such as 3-octenoic acid, 11-dodecenoic acid, linderic acid, lauroleic acid, myristoleic, tsuzuic, palmitoleic acid, petroselinic acid, oleic acid, elaidic acid, vaccenic acid, gadoleic acid, cetoleic acid, nervonic acid, linoleic acid, linolenic acid, eleosteric acid, eicosatetraenoic acid, nisinic acid, scoliodonic acid, and chaulmoogric acid. Quite often mixtures of these acids are used. Because of their ready availability and relative ease of polymerization, oleic and linoleic acids are the preferred starting materials for preparing dimerized fatty acids. At the present time the most preferred fatty acid is linoleic acid which is readily available in crude mixtures such as linseed oil, safflower oil and tall oil.

Dimerized fatty acids generally contain at least about 60 percent of dimer in admixture with small amounts of monomer and trimmer. These mixtures are frequently distilled to increase the dimer content by removal of monomer and trimer as described in U.S. Pat. No. 3,297,730. In the preferred embodiment of this invention the dimerized fatty acid has a dimer content of at least about 90 percent. Dimerized fatty acids are also frequently hydrogenated as taught in U.S. Pat. No. 3,256,304 to reduce their color. The most preferred dimerized fatty acid is hydrogenated and has a dimer content of at least about 95 percent.

A third required polyamide-forming monomer is one or more polymethylene diacid of 6 to 18 carbons. Suitable polymethylene diacids include adipic, pimelic, suberic, azalaic, sebacic, dodecanedioic, brassylic, tetradecanedioic and octadecanedioic acids.

The fourth required polyamide-forming monomer may be one or more polymethylene diacid of 6 to 18 carbons different from the polymethylene diacid which is used as the third required polyamide-forming monomer, or one or more omega-aminoacid of 6 to 18 carbons. Suitable aminoacids include 6-aminocaproic, 7-aminoheptanoic, 8-aminocaprylic, 9-aminononanoic, 10-aminodecanoic, 11-aminoundecanoic, 17-aminoheptadecanoic, and the like.

It is not necessary that the above recited polyamide-forming monomers be used per se in the polymerization reaction. It is necessary only that the resulting polyamide repeat units correspond to those derived from the recited monomers. The actual materials used in the polymerization reaction may be the recited monomers or polyamide-forming derivatives of these monomers, such as the acid chloride, ammonium salt, ester, half-ester, and the like. Lactams such as caprolactam may be used in place of amino acids such as 6-aminocaproic acid.

The method of forming polyamides by melt-condensation is well known to those skilled in the art. This polymerization reaction is described, for example, in U.S. Pat. Nos. 2,252,554 and 2,285,009, and British Pat. No. 1,055,-676. The reaction is carried out by heating diacids and diamines, or their polyamide-forming derivatives, and, if desired, amino-acids or their polyamide-forming derivatives, at temperatures of about 150° to 300° C. while driving off water and continuing the reaction until the desired molecular weight is obtained. The resulting polyamide will contain substantially equimolar amounts of carbonyl groups and imine groups. The polymer end groups will be carboxylic acid and amine, one of which may be in slight excess depending upon which reactant was present in excess. Preferably, the polymer contains an excess of amine ends over carboxyl ends.

The polyamide products of this invention are highly disordered, resulting in a low degree of crystallinity. Moreover, the attainment of the crystalline state is very sluggish; that is, upon cooling from the melt, both nucleation and the rate of crystallization are relatively slow. Further, crystalline melting occurs over a broad temperature range. Hence, to define the crystallizability, that is, the maximum attainable degree of crystallinity for a given polyamide product, it is necessary to anneal by cooling from the melt at a very slow rate, for example, at the rate of 1° C. per minute or less. Thus, it is convenient to determine relative crystallinity by measuring the heat of fusion of the polyamide after such careful annealing. The polyamides of this invention have annealed heats of fusion of about 5 to 18, and preferably about 7 to 15 calories per gram.

As a consequence of the low crystallizability and sluggish crystallization, the products of this invention do not crystallize upon rapid cooling from the melt. The polyamides of this invention should be quenchable to the amorphous state at a cooling rate of about 100° C. per minute, and preferably at a cooling rate of about 90° C. per minute. Crystallization does occur, however, upon subsequent exposure to temperatures favorable to crystal nucleation and growth, as by slow reheating.

If in doubt concerning detection of crystallization on rapid cooling, one can establish the degree of quenching by reheating at a slow rate, for example, 10° C. per minute, and determining the exothermic heat of crystallization as the sample warms. For purposes of definition the sample is considered to be "quenched to the amorphous state" if this exothermic heat of crystallization, so-called "cold crystallization," is at least 40 percent of the heat of fusion observed on a sample annealed from the melt by cooling at less than 1° C. per minute.

Polyamides are known to have multiple second order transition temperatures of which the $\alpha$-relaxation, or highest temperature relaxation, may be characterized as the upper glass transition temperature. Since the $\alpha$-relaxation temperature is known to be depressed by absorbed water, all properties, measurements and applications recited throughout the specification and claims refer to essentially anhydrous systems. The products of this invention have an upper glass transition temperature in the amorphous state of less than about 30° C., and preferably less than about 20° C. Hence, at normal room temperature the products of this invention are rubbery and tough.

The polyamides of this invention are particularly useful as adhesives for use in the preparation of metal cans having side lapped seams. They are also useful in joining other materials such as plastics, leather, wood, glass and the like.

The polyamides of this invention can be formulated with other ingredients in many ways to achieve special adhesive requirements. For example, substantial amounts of fillers or dyes could be added. Also, it is well known to thermoset or crosslink polyamides by formulation with polyfunctional crosslinking agents.

It has been found that the polyamides of this invention give peel strengths under certain specific methods of application which have not been attained heretofore with other polyamides. Adhesive uses which require high strength, in general also require high peel strength, which is a convenient measure of resistance of the adhesive bond to stress concentration. Peel strength is not a simple property of an adhesive but rather a performance criterion of an adhesive bond depending upon the method of assembly including the time-temperature history, upon adventitious impurities especially water, and upon the methods of testing including mechanical factors, temperature of test, rate of stressing, and the like.

Although it is not intended that this invention be limited to any particular theory, it is believed that the polyamide products of this invention achieve high peel strength performance because of facile stress-induced crystallization, or recrystallization, and orientation under peeling stress. This stress-induced crystallization above the glass point leads to the well known "cold-drawing" behavior which gives high bulk toughness. Thus, a moderate crystallinity is essential to the performance of the polyamides of this invention. At the same time, the degree of crystallinity is so low, and flexibility so high, that mechanical flaws as a result of crystallization shrinkage are minimized.

Best performance is achieved when the polyamide adhesives of this invention are quenched to an essentially amorphous state state during application. Many industrial applications for adhesives demand fast bonding which requires rapid heating, application and rapid cooling of the thermoplastic adhesive. Such applications inherently lead to quenching of the products of this invention to an essentially amorphous state. However, the polyamides of this invention retain high peel strength even if crystallized, and therefore their utility is not limited to quenched applications.

In general, it is well known that polymer bulk strength and toughness is better, the higher the molecular weight. On the other hand, ease of application of thermoplastic adhesives requires higher fluidity than normally obtained at very high molecular weight. Also, higher fluidity facilitates speed of wetting of solid substrates by molten adhesive. Obviously, it is desirable to adjust the molecular weight, which can be quantitatively related to melt viscosity, to the highest value consistent with the application requirements. Normally it is advantageous to adjust the products of this invention to a melt index of about 1 to 200 at 230° C. Melt index is an empirical measurement of inverse melt viscosity measured according to ASTM test method D1238-65T. All melt index numbers used in the specification and claims are obtained with the standard orifice at 230° C. using the 2160 gram weight, equivalent to 43.25 p.s.i. differential pressure, unless otherwise specified. Preferably the polyamides of this invention have a melt index of less than about 15. It is well known, of course, to regulate the molecular weight of melt-condensed polyamides by inclusion of small amounts of monofunctional or trifunctional amines or acids.

Crystalline melting point is another parameter which can be adjusted or selected within limits to suit the need within the scope of the polyamides of this invention. The melting point of a given polyamide is determined by the particular monomers from which it is derived. Because of the broad melting range of the products of this invention, it is frequently desirable to focus attention upon the temperature of complete disappearance of crystallinity. This can be done by observing the minimum flow temperature, that is, the temperature of incipient flow of a sample in the melt index apparatus as the temperature is gradually increased from below the melting point.

The products of this invention are especially suited for the high speed adhesive bonding of the side lapped seams of metal cans. Development of adhesion, especially to the preferred organically coated metal sheet, is very fast at temperatures just above the melting point of the polyamide, necessarily occurring in a few milliseconds consistent with requirements of high speed automated production. High peel strength is developed instantaneously on cooling the bond, permitting mechanical handling and working of the joint. The adhesive bond is stable and retains high peel strength through operations of top-coating the inside of the can and baking this liner for several minutes. For stability in this bake operation it is preferred to use a product having a minimum flow temperature in the range of about 180–210° C.

In the production of metal cans having side lapped seams it is preferred to bond metal which has been precoated with an organic lacquer or enamel. A preferred prime coating is an epoxy-phenolic composition such as that described in French Pat. No. 1,492,346. Another preferred primer composition is a commercial ploybutadiene composition sold by the Du Pont Company under the trade name "Budium."

In application to organic coated substrates, especially to the epoxy-phenolic or "Budium" primers, it has been found to be of some advantage if the products of this invention are slightly amine-functional, that is, have a small excess of amine-ends over carboxylic acid-ends, preferably, in the amount of about $10-100 \times 10^{-6}$ equivalents per gram of excess amine-ends over carboxyl-ends. It is, of course, well known to regulate the end concentration of melt-condensed polyamides by a slight excess or deficiency of amine monomer over acid monomer. This variable obviously has to be correlated with the use of monofunctional acid or amine in the regulation of molecular weight.

Moreover, for the can seam application it is preferred to modify the polyamide interpolymer to contain at least some of the excess amine as secondary imine-links in the polymer chain. This is conveniently accomplished by replacing a small amount, for example, about 1 percent, of the polymethylene diamine with an equimolar amount of polymethylene polyamine, such as, for example, diethylene triamine. In this case, prolonged high temperature finishing of the melt condensation should be avoided to minimize formation of imidazoline rings, according to known chemistry.

EXAMPLES OF THE INVENTION

The following examples, illustrating the novel polyamides disclosed herein and their utility are given without any intention that the invention be limited thereto. All percentages are by weight unless otherwise specified.

Example 1

The following ingredients were charged to a resin kettle:

|  | Moles |
|---|---|
| Hexamethylene diamine | $1.5 \times 0.99$ |
| Diethylene triamine | $1.5 \times 0.01$ |
| Dimerized fatty acid | $1.5 \times 0.36$ |
| Adipic acid | $1.5 \times 0.32$ |
| Sebacic acid | $1.5 \times 0.32$ |
| Acetic acid | $1.5 \times 0.014$ |
| 0.2 g. of a silicone antifoam (Dow Corning Antifoam A). | |

The dimerized fatty acid was a commercially available hydrogenated and fractionated dimer acid containing 96 percent $C_{36}$ dibasic acid, about 4 percent $C_{54}$ tribasic acid and essentially no $C_{18}$ monobasic acid.

The charge was heated with stirring to distill off water at atmospheric pressure while gradually raising the temperature to 200° C. and purging with about 150 cc./min. of nitrogen. A sample was analyzed for end groups, and a small correction (2.1 g.) of hexamethylene diamine was added to give the desired slight excess of amine-ends. The polymer was finished by heating for about two hours while stirring and purging with nitrogen with the melt at 241–249° C. The product was discharged to "Teflon"-coated plates.

A sample of polymer was molded to a small disc, dried, encapsulated in a small crimped dish, melted, and annealed by programmed cooling at 0.2° C. per minute. The sample was evaluated by known methods by differential thermal analysis in a Du Pont "Differential Scanning Calorimeter" (DSC), comparing with known heat of fusion standards to obtain a heat of fusion of about 13 cal./g. melting over an apparent broad range from about 40–190° C. with a maximum at 163° C. The melted sample was program-cooled at 90° C. per minute in the DSC apparatus without detectable crystallization exotherm. This establishes a minimum cooling rate for quenching to the amorphous condition; faster cooling obviously would also avoid crystallization. At some undetermined slower rate crystallization would ensue.

The melt index of the sample at 230° C. was 43 decigrams/minute. Another sample was placed in the melt index apparatus while slowly raising the temperature to observe incipient flow at about 182° C. which was the minimum flow temperature or upper limit of the melting range.

Another sample was melted in a thin film on aluminum foil on a hot plate with a 250–300° C. surface. The sample was rapidly transferred to a chilled aluminum block. A small disc was cut and charged to the Du Pont 900 Thermal Mechanical Analyzer and program-heated to obtain a penetrometer softening point on the quenched sample of about 12° C. This procedure correlates well with a torsion modulus loss peak corresponding to the upper glass transition temperature.

A sample was found to contain $29 \times 10^{-6}$ equivalents per gram of carboxyl ends and $73 \times 10^{-6}$ equivalents per gram of amine ends which affords $44 \times 10^{-6}$ equivalents per gram of excess amine ends.

Adhesive performance was tested by molding a 5-mil film and placing it between two one-inch wide strips of commercial "tin-free-steel" coated with commercial epoxyphenolic enamel (EP/TFS). The laminate was heated for 10 seconds under 20 p.s.i. pressure in a "Sentinel" hot bar sealer at about 300° C. and then rapidly quenched between large aluminum blocks at room temperature. The sample was promptly peeled in an Instron testing machine by bending the free ends of the laminate over ½ inch diameter free-rolling rolls spaced ⅝ inch on center in a testing jig, and pulling the free ends held together in one clamp with the jig in the other at the rate of 1 inch per minute. This is called a "quenched 360° peel." The integrated average peel force was 85 lb./lineal inch, corrected for the force to pull the two substrate strips through the jig without adhesive.

Another laminated strip sample, similarly sealed, was laid on a preheated aluminum block in an oven at 160° C. for five minutes and then withdrawn and convection cooled. It was promptly tested as above showing an integrated corrected peel force of 83 lb./lineal inch.

The data obtained are summarized in Table II.

Example 2

Another sample in the same proportions as in Example 1 was prepared on larger scale and similarly tested and evaluated. The data obtained are given in Table II.

Example 3

A polyamide was prepared in commercial scale equipment using the same proportions as in Example 1 except that the acetic acid was omitted. Excess water was evaporated at about 25 p.s.i. and finally at 23 inches vacuum while raising the temperature over a period of about four hours to about 265° C. The product was cast and cut by conventional methods. The data obtained upon evaluation of the polyamide are given in Table II.

The polyamide product was run on a commercial can making line and produced cans having side lapped seams of good quality. The cans showed good peel strength in the quality control peel test of the side-seam before and after top-coat baking.

Examples 4–15

Polymers of other compositions were prepared and tested as in Example 1. The composition of the polyamides is given in Table I and the data obtained are given in Table II.

TABLE I

| | Mole percent | | | | |
|---|---|---|---|---|---|
| | Diacid components | | | Amine components | |
| Ex. No. | Dimer | Adipic | Sebacic (or other) | Hexamethylene diamine | Diethylene triamine |
| 1 | 36 | 32 | 32 | 99 | 1 |
| 2 | 36 | 32 | 32 | 9 | 1 |
| 3 | 36 | 32 | 32 | 99 | 1 |
| 4 | 36 | 32 | 32 | 100 | 0 |
| 5 | 23 | 42 | 35 | 99 | 1 |
| 6 | 25 | 25 | 50 | 99 | 1 |
| 7 | 47 | 33 | 20 | 99 | 1 |
| 8 | [1] 47 | 33 | 20 | 99 | 1 |
| 9 | 50 | 15 | 35 | 99 | 1 |
| 10 | 50 | 35 | 15 | 99 | 1 |
| 11 | 10 | 30 | 60 | 99 | 1 |
| 12 | 15 | 33 | 52 | 99 | 1 |
| 13 | 25 | 25 | [2] 50 | 99 | 1 |
| 14 | 33.3 | 33.3 | [3] 33.3 | 100 | 0 |
| 15 | 40 | 35 | [4] 25 | 99 | 1 |

[1] Commercial unhydrogenated "dimer acid" mixture containing about 93% "dimer," 6% "trimmer," 1% monomer.
[2] Azelaic.
[3] Caprolactam.
[4] Dodecanedioic.

TABLE II

| Example No. | Heat of fusion, cal./g. | Effective quenching rate, ° C./min. | Quenched glass transition temp., (° C.) | Melt index at 230° C. | Minimum flow temp., (° C.) | Excess amine ends, eq./g.×10⁶ | Quenched 360° peel on EP/TFS | |
|---|---|---|---|---|---|---|---|---|
| | | | | | | | Initial | Aged 5 min. at 160° C. |
| 1 | 13 | 90 | 12 | 43 | 182 | 44 | 85 | 83 |
| 2 | | | | 17 | 184 | 41 | 94 | 106 |
| 3 | | | | 9 | 178 | 30 | | |
| 4 | | | | 15 | 182 | 24 | 85 | 55 |
| 5 | 14 | 53 | 18 | 47 | 202 | 62 | 97 | [1] 31 |
| 6 | 15 | 20 | 5 | 15 | 180 | 56 | 68 | [2] 31 |
| 7 | 9 | 60 | −3 | 20 | 190 | 30 | 88 | 88 |
| 8 | 10 | 40 | 11 | 21 | 190 | 34 | 99 | 120 |
| 9 | 8 | 60 | 5 | 27 | 164 | 36 | 114 | 142 |
| 10 | 9 | 60 | 2 | 42 | 195 | 20 | 126 | 105 |
| 11 | 16 | 40 | 22 | 38 | 187 | 35 | 56 | 19 |
| 12 | 14 | 40 | 15 | 51 | 182 | 25 | 54 | [1] 26 |
| 13 | 12 | 40 | 18 | 26 | 167 | 73 | {77 {66 | [2] 46 [3] 50 |
| 14 | 7 | 55 | 11 | 63 | 161 | 9 | 57 | 58 |
| 15 | | | | 53 | 194 | 48 | 90 | 88 |

[1] Aged 1 hour at 80° C.
[2] Aged 24 hours in steam at one atmosphere.
[3] Tested on "Budium"-primed TFS.

Although the invention has been described and exemplified by way of specific embodiments, it is not intended that it be limited thereto. As will be apparent to those skilled in the art, numerous modifications and variations of these embodiments, such as the substitution of equivalents, can be made without departing from the spirit of the invention or the scope of the following claims. For example, substitution of one polymethylene chain for another has a relatively small predictable effect. But in any case substitutions can be empirically evaluated and shifts in relative proportions can be made to compensate, at least in part, for certain observed effects.

I claim:

1. A melt-condensed polyamide interpolymer consisting essentially of at least three different recurring polyamide repeat units in which
   (a) 20–100 mole percent of the imine groups correspond to those derived from polymethylene diamine of 6 to 20 carbons,
   (b) 5–65 mole percent of the carbonyl groups correspond to those derived from dimerized fatty acid of 16 to 48 carbons, in which the dimer content is at least 60% by weight,
   (c) 8–65 mole percent of the carbonyl groups correspond to those derived from polymethylene diacid of 6 to 18 carbons, and
   (d) 8–65 mole percent of the carbonyl groups correspond to those derived from monomer selected from the group consisting of
      (1) polymethylene diacid of 6 to 18 carbons different from diacid (c), and
      (2) polymethylene omega-aminoacid of 6 to 18 carbons, said polyamide having a melt index of 1 to 200 at 230° C., having an annealed heat of fusion of 5 to 18 calories per gram, being quenchable to the amorphous state at a cooling rate of 100° C. per minute, and having an upper glass transition temperature in the amorphous state of less than 30° C.

2. The melt-condensed polyamide interpolymer of claim 1 which has an annealed heat of fusion of 7 to 15 calories per gram, is quenchable to the amorphous state at a cooling rate of 90° C. per minute, and has an upper glass transition temperature in the amorphous state of less than 20° C.

3. The melt-condensed polyamide interpolymer of claim 2 which has a melt index of less than 15.

4. The melt-condensed polyamide interpolymer of claim 3 in which
   (a) substantially 100 mole percent of the imine groups correspond to those derived from hexamethylene diamine,
   (b) 15–55 mole percent of the carbonyl groups correspond to those derived from dimerized fatty acid of 36 carbons,
   (c) 10–45 mole percent of the carbonyl groups correspond to those derived from adipic acid, and
   (d) 15–55 mole percent of the carbonyl groups correspond to those derived from polymethylene diacid of 10 to 12 carbons.

5. The melt-condensed polyamide interpolymer of claim 4 in which the minimum flow temperature is 180° to 210° C.

6. The melt-condensed polyamide interpolymer of claim 5 in which
   (a) substantially 100 mole percent of the imine groups correspond to those derived from hexamethylene diamine,
   (b) 25–55 mole percent of the carbonyl groups correspond to those derived from dimerized fatty acid of 36 carbons,
   (c) 15–45 mole percent of the carbonyl groups correspond to those derived from adipic acid, and
   (d) 15–45 mole percent of the carbonyl groups correspond to those derived from polymethylene diacid of 10 to 12 carbons.

7. The melt-condensed polyamide interpolymer of claim 6 in which the dimerized fatty acid has a dimer content of at least 90 percent.

8. The melt-condensed polyamide interpolymer of claim 2 in which there is $10 \times 10^{-6}$ to $100 \times 10^{-6}$ equivalents per gram of excess amine-ends over carboxylic acid-ends.

9. The melt-condensed polyamide interpolymer of claim 8 in which 1 percent of the polymethylene diamine is replaced by an equimolar amount of diethylene triamine.

References Cited
UNITED STATES PATENTS

| | | | |
|---|---|---|---|
| 2,886,543 | 5/1959 | Peerman et al. | 260—18 |
| 3,397,816 | 8/1968 | Ess et al. | 260—18 |
| 3,447,999 | 6/1969 | Rogier et al. | 260—18 |
| 3,454,412 | 7/1969 | Stokes | 260—18 |
| 3,499,853 | 3/1970 | Griebsch et al. | 260—18 |

DONALD E. CZAJA, Primary Examiner

E. C. RZUCIDLO, Assistant Examiner

U.S. Cl. X.R.

117—132 R; 161—227; 260—404.5